United States Patent
Ishibashi et al.

(10) Patent No.: US 7,831,362 B2
(45) Date of Patent: Nov. 9, 2010

(54) POSITION MEASURING SYSTEM FOR WORKING MACHINE

(75) Inventors: Hideto Ishibashi, Niihari-gun (JP); Kazuo Fujishima, Niihari-gun (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 10/503,096

(22) PCT Filed: Sep. 29, 2003

(86) PCT No.: PCT/JP03/12391
§ 371 (c)(1), (2), (4) Date: Jul. 30, 2004

(87) PCT Pub. No.: WO2004/031689
PCT Pub. Date: Apr. 15, 2004

(65) Prior Publication Data
US 2005/0080559 A1    Apr. 14, 2005

(30) Foreign Application Priority Data
Oct. 2, 2002    (JP)    ............................. 2002-289476

(51) Int. Cl.
*G06F 19/00*    (2006.01)

(52) U.S. Cl. ............................. 701/50; 701/215; 37/91; 37/341

(58) Field of Classification Search .................. 701/50, 701/26, 36, 29, 213, 214, 215, 35, 207; 172/2; 37/348, 414, 382, 91, 341; 340/426.18
See application file for complete search history.

(56) References Cited

U.S. PATENT DOCUMENTS

| | | | |
|---|---|---|---|
| 5,714,948 A | | 2/1998 | Farmakis |
| 5,742,915 A | * | 4/1998 | Stafford .................... 455/456.1 |
| 5,935,183 A | | 8/1999 | Sahm et al. |
| 5,951,613 A | * | 9/1999 | Sahm et al. .................... 701/50 |
| 5,987,371 A | * | 11/1999 | Bailey et al. .................... 701/50 |
| 6,062,317 A | * | 5/2000 | Gharsalli et al. ................ 172/2 |
| 6,099,236 A | | 8/2000 | Wiechman |
| 6,122,595 A | | 9/2000 | Varley |
| 6,204,772 B1 | * | 3/2001 | DeMay et al. ............ 340/686.1 |
| 6,205,381 B1 | * | 3/2001 | Motz et al. ..................... 701/25 |
| 6,418,364 B1 | * | 7/2002 | Kalafut et al. ................. 701/50 |

(Continued)

FOREIGN PATENT DOCUMENTS

JP    10-38570    2/1998

(Continued)

*Primary Examiner*—Ronnie Mancho
(74) *Attorney, Agent, or Firm*—Mattingly & Malur, P.C.

(57) ABSTRACT

The invention is intended to provide a position measuring system for a working machine, which can accurately measure the position of a monitoring point and can ensure high working efficiency even when measurement accuracy of a machine-equipped GPS has changed. A panel computer (45) computes the position of the monitoring point, which is set on an operating mechanism, in a three-dimensional space based on values measured by GPS receivers (43, 44) and angle sensors (21, 22, 23). When measurement accuracy of at least one of at least two GPS receivers lowers, the panel computer (45) corrects the computation for the position of the monitoring point based on a yaw angle measured by a gyroscope (25) for measuring the yaw angle of a machine body.

8 Claims, 14 Drawing Sheets

U.S. PATENT DOCUMENTS

| | | |
|---|---|---|
| 6,643,576 B1 * | 11/2003 | O Connor et al. ............. 701/50 |
| 6,711,838 B2 * | 3/2004 | Staub et al. .................. 37/348 |
| 6,804,587 B1 * | 10/2004 | O Connor et al. ............. 701/26 |
| 2001/0018638 A1 | 8/2001 | Quincke |
| 2003/0191568 A1 * | 10/2003 | Breed ......................... 701/36 |
| 2004/0004540 A1 * | 1/2004 | Komatsu et al. ....... 340/426.18 |

FOREIGN PATENT DOCUMENTS

| | | |
|---|---|---|
| JP | 10-311022 | 11/1998 |
| JP | 2001-98585 | 4/2001 |
| JP | 2002-4261 | 1/2002 |

* cited by examiner

POSITION MEASURING SYSTEM FOR WORKING MACHINE

TECHNICAL FIELD

The present invention relates to a position measuring system for a working machine such as a hydraulic excavator, and more particularly to a position measuring system for a working machine, which is suitable for measuring an absolute position of a monitoring point in a three-dimensional space.

BACKGROUND ART

Recently, it has been practiced in construction sites to measure the position of a monitoring point set on a construction machine by employing a three-dimensional position measuring device, such as a GPS, for management of work. One typical example of the monitoring point is a position of an operating mechanism of the construction machine, for example, a bucket fore end position of a hydraulic excavator. By measuring the bucket fore end position, progress situations of work under execution can be confirmed by comparing measured data with preset landform data and target configuration data, and the management of the work can be performed during the execution. Even after the execution, the management of the work can also be performed by producing completed configuration data (e.g., excavated landform data) from the measured data.

As disclosed in JP,A 2001-98585, for example, a prior-art position measuring system of that type includes the steps of measuring a three-dimensional position of an excavation operating mechanism (bucket) to compute a working plane, determining an intersect line of the working plane with a three-dimensional target landform, displaying relative positions of the intersect line and the excavation operating mechanism, and measuring a fore end position of the bucket by using angle sensors for a boom, an arm and the bucket and GPS's installed in front and rear portions of a machine body.

DISCLOSURE OF THE INVENTION

However, the system disclosed in JP,A 2001-98585 has a problem of changes in GPS measurement accuracy. A machine-equipped GPS for measuring the positions of the machine body and the excavation operating mechanism, e.g., the bucket, generally employs RTK (Real Time Kinematic)—GPS. In other words, a GPS (hereinafter referred to as a "GPS reference station") is installed as a reference station away from the machine body, and the machine-equipped GPS receives correction data transmitted from the GPS reference station and processes it in combination with signals from GPS satellites. As a result, the position of an antenna of the machine-equipped GPS can be measured with accuracy of about ±1 to 2 cm (FIX state).

In that RTK-GPS, however, the measurement state is affected by the condition of receiving the signals from the GPS satellites and the correction data transmitted from the GPS reference station. More specifically, when the number of satellites from which signals are receivable reduces, or when the correction data from the GPS reference station cannot be received, the measurement accuracy may change to about ±20 to 30 cm in the FLOAT state, about ±1 m in the DGPS (Differential GPS) state, or about ±10 m in the single measurement state.

If the measurement accuracy of the machine-equipped GPS changes as mentioned above, the measurement results enough to perform management cannot be obtained and the work must be suspended, thus leading to a problem of reduction in working efficiency. In the system disclosed in JP,A 2001-98585, particularly, an influence resulting from change in the measurement accuracy of the machine-equipped GPS is serious because the bucket position is indirectly measured from the GPS measurement result.

It is an object of the present invention to provide a position measuring system for a working machine, which can accurately measure the position of a monitoring point and can ensure high working efficiency even when measurement accuracy has changed.

In this description, the term "absolute position in a three-dimensional space" means a position expressed using a coordinate system set externally of a construction machine. For example, when a GPS is employed as a three-dimensional position measuring device, that term means a position expressed using a coordinate system fixed to a reference ellipsoid that is employed as a reference for latitude, longitude and altitude in the GPS.

Also, in this description, a coordinate system set on the reference ellipsoid is called a global coordinate system.

(1) To achieve the above object, the present invention provides a position measuring system for a working machine comprising a machine body and an operating mechanism, the position measuring system comprising at least two three-dimensional position measuring means disposed in the machine body and measuring positions in a three-dimensional space; position computing means for computing a position of a monitoring point in the three-dimensional space based on values measured by the at least two position measuring means; and yaw angle measuring means for measuring a yaw angle of the working machine, the position computing means correcting the computation for the position of the monitoring point based on the yaw angle measured by the yaw angle measuring means when measurement accuracy of at least one of the at least two three-dimensional position measuring means lowers.

Thus, by correcting the computation for the position of the monitoring point based on the yaw angle measured by the yaw angle measuring means when measurement accuracy of at least one of the at least two three-dimensional position measuring means lowers, the position of the monitoring point can be accurately measured and working efficiency can be increased even when the measurement accuracy has changed.

(2) In above (1), preferably, the position measuring system further comprises inclination amount measuring means for measuring an inclination amount of the working machine, wherein the position computing means corrects the computation for the position of the monitoring point based on the yaw angle measured by the yaw angle measuring means and the inclination amount measured by the inclination amount measuring means when measurement accuracy of at least one of the at least two three-dimensional position measuring means lowers.

(3) In above (1), preferably, when the correction is executed, the position computing means informs an operator that the correction is being executed.

(4) In above (1), preferably, when the measurement accuracy of all of the at least two three-dimensional position measuring means lowers, the position computing means informs an operator that travel of the working machine is prohibited.

(5) In above (4), preferably, when the measurement accuracy of at least one of the at least two three-dimensional position measuring means restores, the position computing means informs an operator that travel of the working machine is enabled.

(6) In above (3), preferably, the position measuring system further comprises first display means for displaying the position of the monitoring point in accordance with a computation result of the position computing means, wherein notices to be informed to the operator are displayed on the first display means.

(7) In above (3), preferably, the position measuring system further comprises data output means for outputting position data of the monitoring point obtained as the computation result of the position computing means; data input means disposed in a position different from the working machine and receiving the position data outputted from the data output means; and second display means for displaying the position of the monitoring point in accordance with the position data received by the data input means, wherein notices to be informed to the operator are displayed on the second display means.

(8) In above (1), preferably, the operating mechanism comprises a plurality of rotatable members, the monitoring point is set on the operating mechanism, the position measuring system further comprises angle measuring means for detecting respective angles between adjacent two of the plurality of members of the operating mechanism, and the position computing means computes the position of the monitoring point in the three-dimensional space based on values measured by the at least two position measuring means and the angle measuring means.

BEST MODE FOR CARRYING OUT THE INVENTION

A position measuring system for a working machine according to an embodiment of the present invention will be described below with reference to FIGS. 1 to 11. In this embodiment, the present invention is applied to a crawler type hydraulic excavator, i.e., a construction machine as typical one of working machines, and a monitoring point is set to a bucket fore end of the hydraulic excavator.

Figure 1:
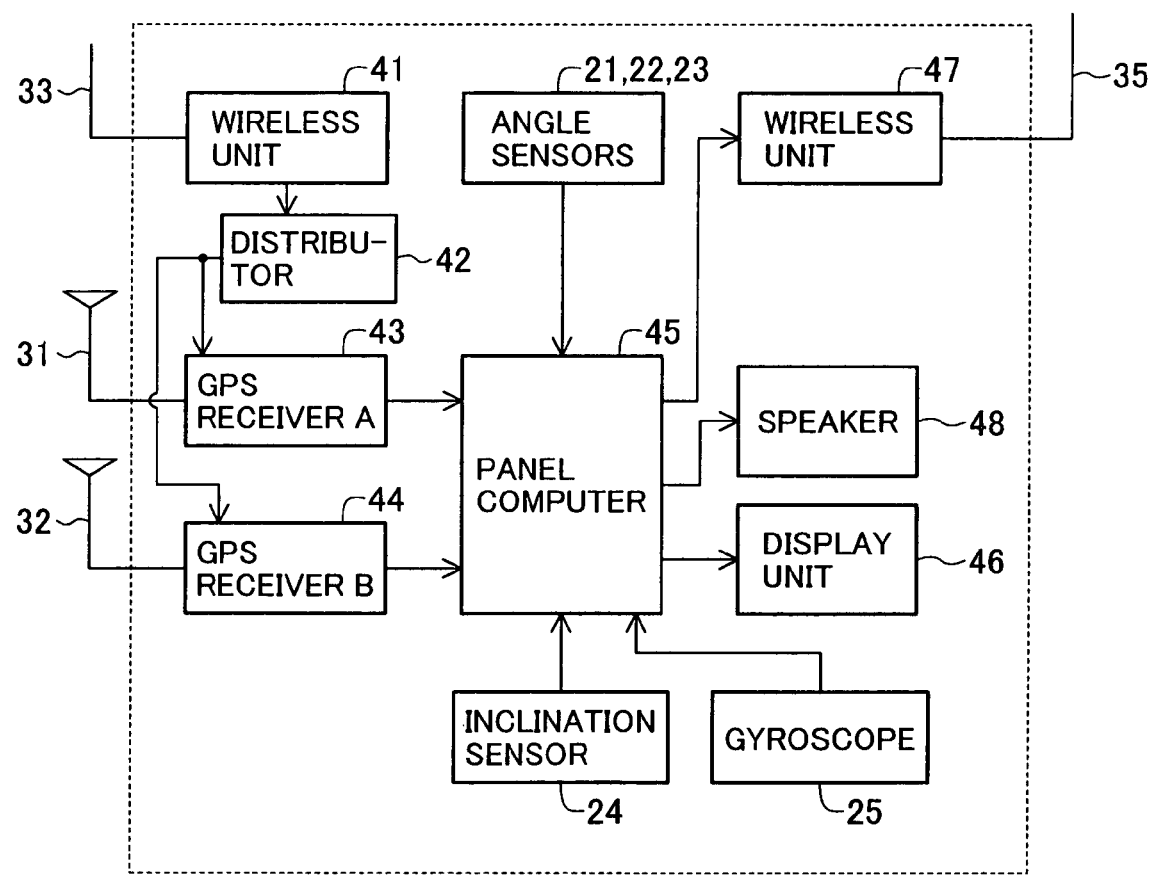
FIG. 1 is a block diagram showing the configuration of a work position measuring system in a construction machine according to one embodiment of the present invention.

FIG. 1 is a block diagram showing the configuration of a position measuring system for a construction machine according to one embodiment of the present invention.

The position measuring system comprises a wireless unit 41 for receiving correction data (described later) from a reference station via an antenna 33; a distributor 42 for distributing the correction data received by the wireless unit 41; GPS receivers 43, 44 for measuring respective three-dimensional positions of GPS antennas 31, 32 in real time based on the correction data distributed from the distributor 42 and signals from GPS satellites received by the GPS antennas 31, 32; a panel computer 45 for computing the position of a fore end (monitoring point) of a bucket 7 of a hydraulic excavator 1 based on position data from the GPS receivers 43, 44 and angle data from various sensors, such as angle sensors 21, 22 and 23, an inclination sensor 24 and a gyroscope 25, the panel computer 45 storing later-described data representing a three-dimensional target landform in a predetermined memory; a display unit 46 for displaying the position data computed by the panel computer 45 and the three-dimensional target landform together with illustrations, etc.; a wireless unit 47 for transmitting the position data computed by the panel computer 45 and corresponding computation status data via an antenna 35; and a speaker 48 for informing an operator of the computation status of the computer 45 in voices. A pair of the GPS antenna 31 and the GPS receiver 43 and a pair of the GPS antenna 32 and the GPS receiver 44 each constitutes one set of GPS (Global Positioning System).

Figure 2:
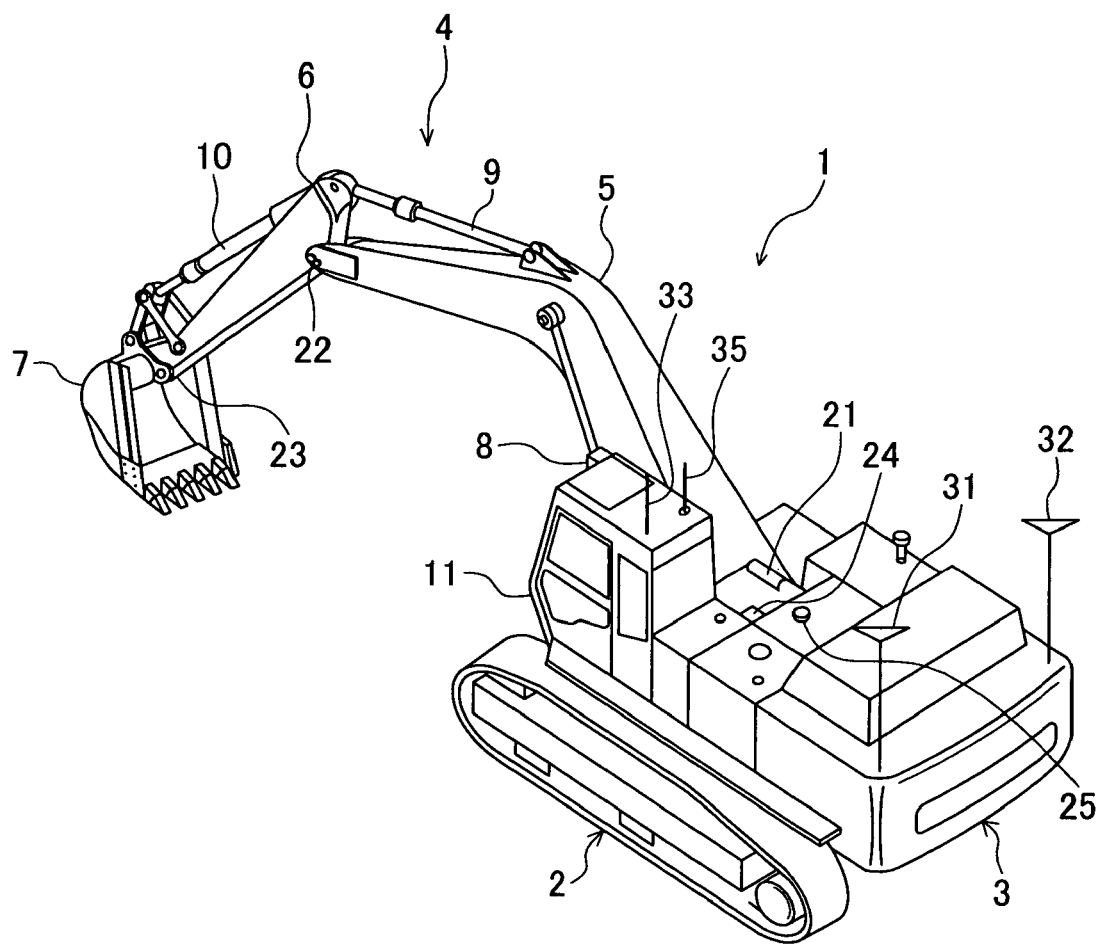
FIG. 2 shows an outward appearance of a hydraulic excavator equipped with the work position measuring system according to one embodiment of the present invention.

FIG. 2 shows an outward appearance of a hydraulic excavator equipped with the work position measuring system according to the embodiment of the present invention.

The hydraulic excavator 1 comprises a lower travel structure 2, an upper swing body 3 swingably mounted to the lower travel structure 2 and constituting a machine body together with the lower travel structure 2, and a front operating mechanism 4 mounted to the upper swing body 3. The front operating mechanism 4 comprises a boom 5 vertically rotatably mounted to the upper swing body 3, an arm 6 vertically rotatably mounted to a fore end of the boom 5, and a bucket 7 vertically rotatably mounted to a fore end of the arm 6. The boom 5, the arm 6 and the bucket 7 are driven respectively with extension and contraction of a boom cylinder 8, an arm cylinder 9 and a bucket cylinder 10. A cab 11 is provided on the upper swing body 3.

The hydraulic excavator 1 is provided with an angle sensor 21 for detecting a rotational angle of the boom 5 relative to the upper swing body 3 (i.e., a boom angle), an angle sensor 22 for detecting a rotational angle of the arm 6 relative to the boom 5 (i.e., an arm angle), an angle sensor 23 for detecting a rotational angle of the bucket 7 relative to the arm 6 (i.e., a bucket angle), an inclination sensor 24 for detecting an inclination angle of the upper swing body 3 in the longitudinal direction (i.e., a pitch angle) and an inclination angle thereof in the transverse direction (i.e., a roll angle), and a gyroscope 25 for detecting a yaw angle of the hydraulic excavator 1.

Further, the hydraulic excavator 1 is provided with the two GPS antennas 31, 32 receiving the signals from the GPS satellites, the wireless antenna 33 for receiving the correction data (described later) from the reference station, and the wireless antenna 35 for transmitting the position data. The two GPS antennas 31, 32 are installed respectively in rear left and right corners of the upper swing body 3 offset from the center about which the upper swing body 3 swings.

Figure 3:
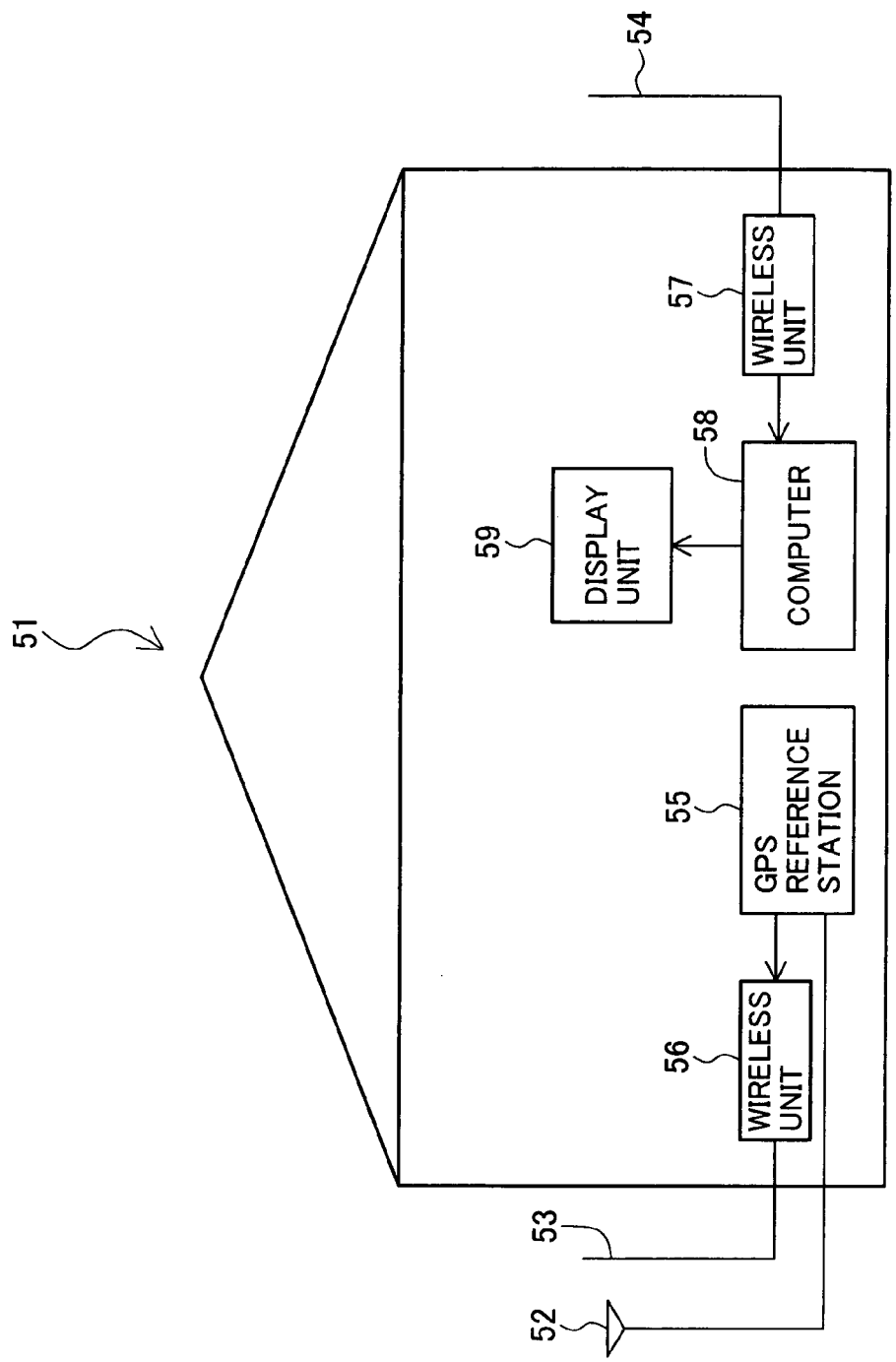
FIG. 3 is a block diagram showing the configuration of an office-side system serving as a GPS reference station.

FIG. 3 is a block diagram showing the configuration of an office-side system serving as a GPS reference station.

An office 51 for managing the positions and operations of the hydraulic excavator 1, the bucket 7, etc. includes a GPS antenna 52 for receiving the signals from the GPS satellites; a wireless antenna 53 for transmitting the correction data to the hydraulic excavator 1; a wireless antenna 54 for receiving, from the hydraulic excavator 1, the position data of the hydraulic excavator 1, the bucket 7, etc. and the corresponding computation status data; a GPS receiver 55 serving as a GPS reference station for producing the correction data, which is used by the GPS receivers 43, 44 of the hydraulic excavator 1 for RTK (Real Time Kinematic) measurement, based on three-dimensional position data measured in advance and the signals from the GPS satellites received by the GPS antenna 52; a wireless unit 56 for transmitting the correction data produced by the GPS receiver 55 via the antenna 53; a wireless unit 57 for receiving the position data via the antenna 54; a computer 58 for executing processing to display and manage the positions of the hydraulic excavator 1, the bucket 7, etc. based on the position data and the corresponding computation status data received by the wireless unit 57, and to display data representing the three-dimensional target landform; and a display unit 59 for displaying the position data, the computation status data and management data computed by the computer 58, and the three-dimensional target landform together with illustrations, etc. The GPS antenna 52 and the GPS receiver 55 constitute one set of GPS.

The principles of operation of the position measuring system according to this embodiment will be described below. In this embodiment, to perform the position measurement with high accuracy, each of the GPS receivers 43, 44 shown in FIG. 1 executes the RTK measurement. The GPS reference station 55 for producing the correction data, shown in FIG. 3, is required for executing the RTK measurement. The GPS reference station 55 produces the correction data for the RTK measurement, as mentioned above, based on the position data of the antenna 52 three-dimensionally measured in advance and the signals from the GPS satellites received by the antenna 52. The produced correction data is transmitted from the wireless unit 56 at a certain cycle via the antenna 53.

On the other hand, the GPS receivers 43, 44 equipped on the excavator, shown in FIG. 1, obtain the three-dimensional positions of the antennas 31, 32 through RTK measurements based on the correction data received by the wireless unit 41, 42 via the antenna 33 and the signals from the GPS satellites received by the antennas 31, 32. The RTK measurements enable the three-dimensional positions of the antennas 31, 32 to be measured with accuracy of about ±1 to 2 cm. The measured three-dimensional position data is then inputted to the panel computer 45.

Further, the inclination sensor 24 measures the pitch angle and the roll angle of the hydraulic excavator 1, the angle sensors 21 to 23 measure the respective angles of the boom 5, the arm 6 and the bucket 7, and the gyroscope 25 measures the yaw angle of the hydraulic excavator 1. The measured data is also inputted to the panel computer 45.

Based on the position data from the GPS receivers 43, 44 and the angle data from the various sensors 21 to 24, the panel computer 45 executes general vector operations and coordinate transforms, thereby computing the three-dimensional position of the fore end of the bucket 7.

The three-dimensional position arithmetic processing executed in the panel computer 45 will be described below with reference to FIG. 4 to 11.

Figure 4:
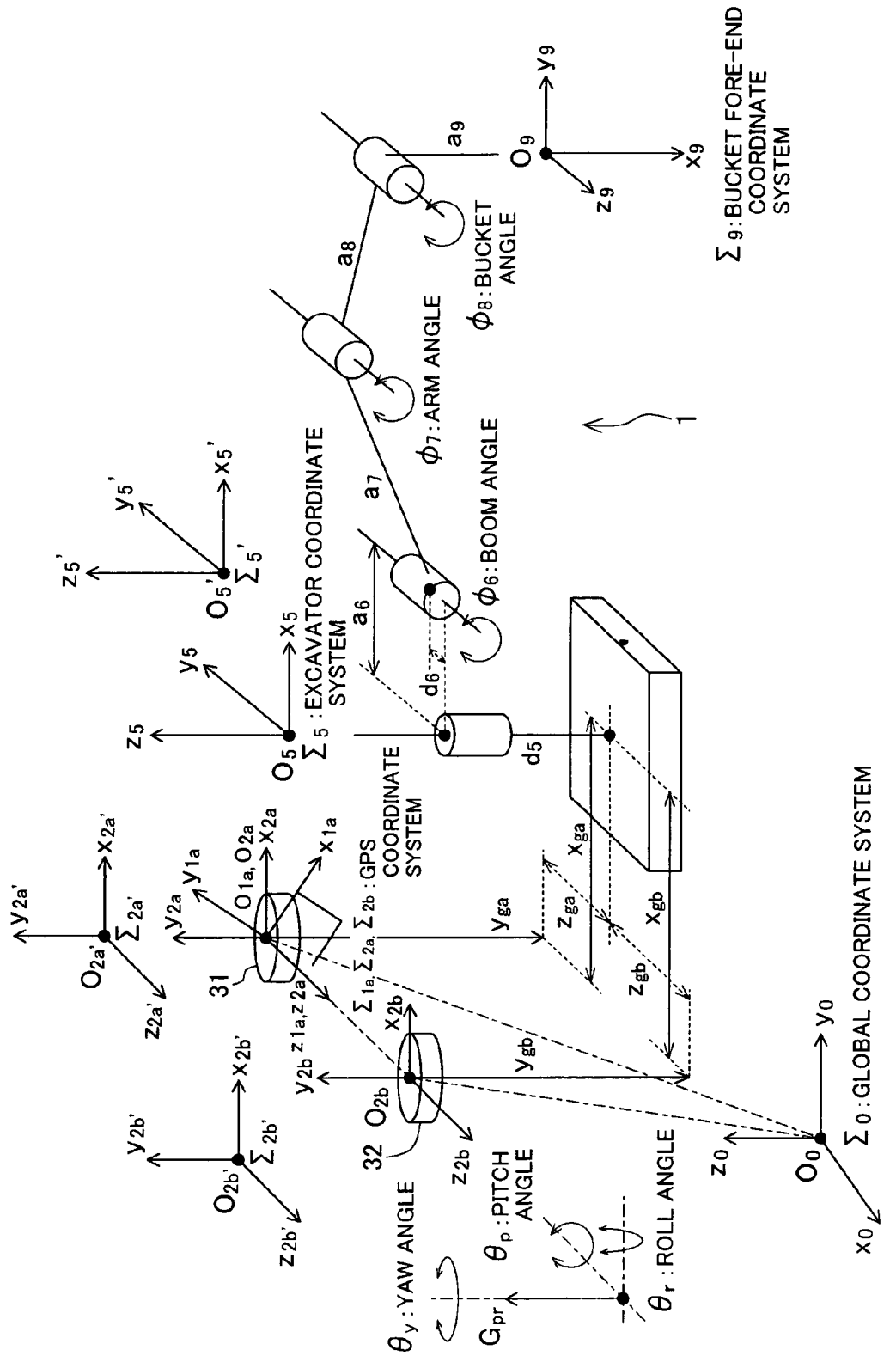
FIG. 4 shows coordinate systems for use in computing an absolute position of a bucket fore end in a three-dimensional space.

FIG. 4 shows coordinate systems for use in computing an absolute position of the fore end of the bucket 7 in a three-dimensional space.

In FIG. 4, $\Sigma 0$ represents a global coordinate system having the origin O0 at the center of the reference ellipsoid in the GPS. Each of $\Sigma 1a$, $\Sigma 2a$, $\Sigma 2b$, $\Sigma 2a'$ and $\Sigma 2b'$ represents a GPS coordinate system having the origin at the measurement position of the GPS antenna 31, 32. Also, each of $\Sigma 5$ and $\Sigma 5'$ represents an excavator coordinate system that is fixed to the upper swing body 3 of the hydraulic excavator 1 and has the origin at a cross point between a swing base frame and the swing center. Further, $\Sigma 9$ represents a bucket fore-end coordinate system that is fixed to the bucket 7 and has the origin at the fore end of the bucket 7.

In addition, Gpr represents a vector perpendicular to the body of the hydraulic excavator 1, which is determined based on a pitch angle $\theta p$ and a roll angle $\theta r$ of the hydraulic excavator 1 measured by the inclination sensor 24.

If the three-dimensional positions of the GPS antennas 31, 32 on the global coordinate system $\Sigma 0$ are obtained, the GPS coordinate system $\Sigma 1a$ can be determined from those positional relationships. Further, the GPS coordinate systems $\Sigma 2a$ and $\Sigma 2b$ can be determined from those positional relationships and the pitch angle $\theta p$ of the hydraulic excavator 1.

Because positional relationships $x_{ga}$, $x_{gb}$, $y_{ga}$, $y_{gb}$, $z_{ga}$, $z_{gb}$, and d5 of the GPS antenna 31, 32 on the hydraulic excavator 1 are known, the excavator coordinate system $\Sigma 5$ can be determined.

Moreover, because positional relationships a6 and d6 between the origin O5 of the excavator coordinate system $\Sigma 5$ and a base end of the boom 5 and respective dimensions a7, a8 and a9 of the boom 5, the arm 6 and the bucket 7 are known, the bucket fore-end coordinate system $\Sigma 9$ can be determined if a boom angle $\phi 6$, an arm angle $\phi 7$ and a bucket angle $\phi 8$ are obtained.

Accordingly, the fore end position of the bucket 7 can be determined as values on the global coordinate system $\Sigma 0$ by obtaining, as values on the global coordinate system $\Sigma 0$, the three-dimensional positions of the GPS antennas 31, 32 which have been measured by the GPS receivers 43, 44, measuring the pitch angle $\theta p$ of the hydraulic excavator 1 by the inclination sensor 24, measuring the boom angle $\phi 6$, the arm angle $\phi 7$ and the bucket angle $\phi 8$ respectively by the angle sensors 21 to 23, and executing coordinate transform processing.

Figure 5:
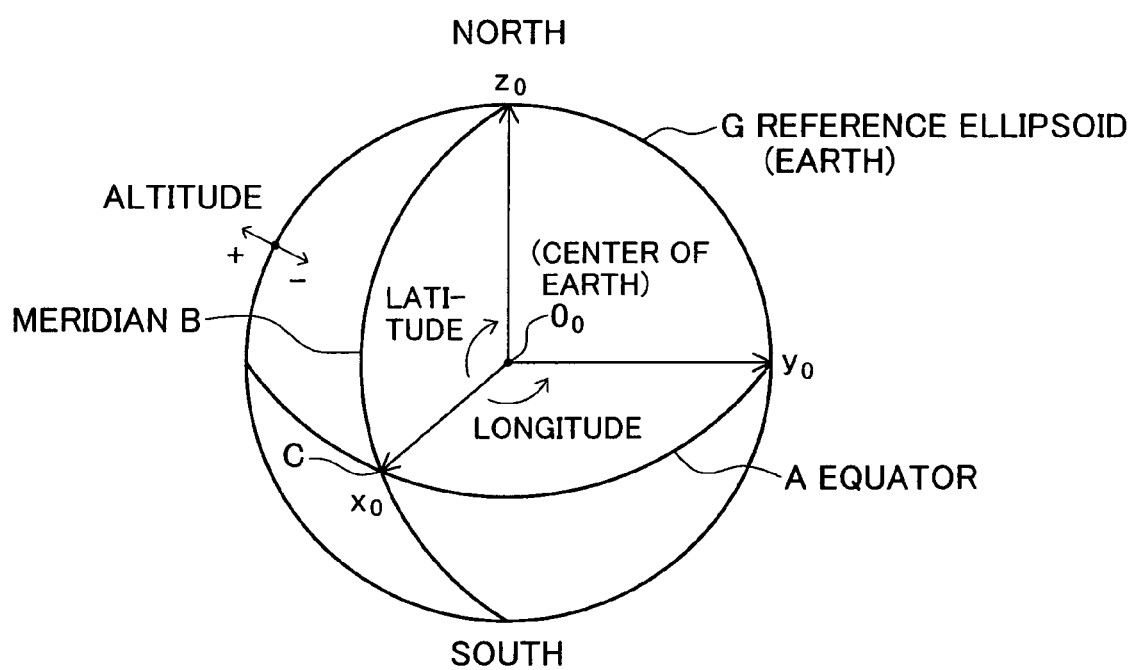
FIG. 5 is an explanatory view for explaining the basic concept of a global coordinate system.

FIG. 5 is an illustration for explaining the basic concept of the global coordinate system.

In FIG. 5, G represents a reference ellipsoid used in the GPS, and the origin O0 of the global coordinate system $\Sigma 0$ is set to the center of the reference ellipsoid. Also, an x0-axis of the global coordinate system $\Sigma 0$ is directed to lie on a line passing a cross point C between the equator A and the meridian B and the center of the reference ellipsoid G. A z0-axis is directed to lie on a line extending from the center of the reference ellipsoid G to the south and the north, and a y0-axis is directed to lie on a line perpendicular to both the x0-axis and the z0-axis. In the GPS, a position on the earth is expressed using latitude, longitude, and altitude (height) relative to the reference ellipsoid G. By setting the global coordinate system $\Sigma 0$ as described above, therefore, position information based on the GPS can be easily converted into values on the global coordinate system $\Sigma 0$.

With reference to FIG. 4, the following description is made of processing to be executed when a change has occurred in measurement accuracy of the machine-equipped GPS.

As described above, the measurement accuracy of the machine-equipped GPS is not always in the best state (FIX).

Therefore, some correction must be carried out when the measurement accuracy of the machine-equipped GPS is in the state other than FIX.

First, the case where the measurement accuracy of GPS_A comprising the GPS antenna 31 and the GPS receiver 43 is in the state other than FIX will be described as a first case.

In this case, since the measurement accuracy of GPS_B comprising the GPS antenna 32 and the GPS receiver 44 is in the FIX state, the correction can be made by regarding the GPS coordinate system Σ2b as a basis.

Here, the GPS coordinate system Σ2b and the yaw angle of the hydraulic excavator 1 taken when the measurement accuracy of both of GPS_A and GPS_B is in the FIX state, i.e., one cycle before the measurement accuracy of GPS_A comes into the state other than FIX, are assumed to be respectively Σ2b_prv and θy_prv1. Subsequently, the coordinate system Σ2b_prv is translated to a current position (O2b') of the GPS antenna 32. Then, the translated coordinate system Σ2b_prv is subjected to equivalent rotation conversion so that a y-axis of the translated coordinate system Σ2b_prv matches with a gravity axis of the current position (O2b') of the GPS antenna 32. Then, the coordinate system Σ2b-prv having been subjected to the equivalent rotation conversion is rotated by (θy−θy_prv1) about the y-axis of the coordinate system Σ2b_prv having been subjected to the equivalent rotation conversion. Then, the rotated coordinate system Σ2b-prv is subjected to equivalent rotation conversion so that the y-axis of the rotated coordinate system Σ2b_prv matches with the unit vector Gpr perpendicular to the body of the hydraulic excavator 1, thereby determining the coordinate system Σ2b'.

Thus, the fore end position of the bucket 7 on the global coordinate system 10 can be determined from the coordinate system Σ2b' determined as described above, the excavator coordinate systems Σ5, and the bucket fore-end coordinate systems Σ9, the latter two coordinate systems being determined from the known data Xb, yb, Zb and d5, the positional relationships a6 and d6 relative to the base end of the boom 5, the respective dimensions a7, a8 and a9 of the boom 5, the arm 6 and the bucket 7, as well as the boom angle φ6, the arm angle φ7 and the bucket angle φ8.

Accordingly, even when the measurement accuracy of GPS_A is in the state other than FIX, the fore end position of the bucket 7 can be determined with high accuracy. Furthermore, no restrictions are imposed on front and other operations, including travel and swing of the hydraulic excavator 1.

Next, the case where the measurement accuracy of GPS_B comprising the GPS antenna 32 and the GPS receiver 44 is in the state other than FIX will be described as a second case.

In this case, since the measurement accuracy of GPS_A comprising the GPS antenna 31 and the GPS receiver 43 is in the FIX state, the correction can be made by regarding the GPS coordinate system Σ2a as a basis.

Here, the GPS coordinate system Σ2a and the yaw angle of the hydraulic excavator 1 taken when the measurement accuracy of both of GPS_A and GPS_B is in the FIX state, i.e., one cycle before the measurement accuracy of GPS_B comes into the state other than FIX, are assumed to be respectively Σ2a-prv and θy_prv1. Subsequently, the coordinate system Σ2a_prv is translated to a current position (O2a') of the GPS antenna 31. Then, the translated coordinate system Σ2a_prv is subjected to equivalent rotation conversion so that a y-axis of the translated coordinate system Σ2a_prv matches with a gravity axis of the current position (O2a') of the GPS antenna 31. Then, the coordinate system Σ2a_prv having been subjected to the equivalent rotation conversion is rotated by (θy−θy_prv1) about the y-axis of the coordinate system Σ2a_prv having been subjected to the equivalent rotation conversion.

Then, the rotated coordinate system Σ2a_prv is subjected to equivalent rotation conversion so that the y-axis of the rotated coordinate system Σ2a-prv matches with the unit vector Gpr perpendicular to the body of the hydraulic excavator 1, thereby determining the coordinate system Σ2a'.

Thus, the fore end position of the bucket 7 on the global coordinate system Σ0 can be determined from the coordinate system Σ2a' determined as described above, the excavator coordinate systems Σ5, and the bucket fore-end coordinate systems Σ9, the latter two coordinate systems being determined from the known data xa, ya, za and d5, the positional relationships a6 and d6 relative to the base end of the boom 5, the respective dimensions a7, a8 and a9 of the boom 5, the arm 6 and the bucket 7, as well as the boom angle Σ6, the arm angle Σ7 and the bucket angle Σ8.

Accordingly, even when the measurement accuracy of GPS_B is in the state other than FIX, the fore end position of the bucket 7 can be determined at high accuracy. Furthermore, no restrictions are imposed on operations of the front mechanism and others, including travel and swing of the hydraulic excavator 1.

Next, the case where the measurement accuracy of both of GPS_A and GPS_B is in the state other than FIX will be described as a second case.

In this case, the correction can be made by regarding the excavator coordinate system Σ5 as a basis.

Here, the excavator coordinate system Σ5 with respect to the global coordinate system Σ0 and the yaw angle of the hydraulic excavator 1 taken one cycle before the measurement accuracy of both of GPS_A and GPS_B comes into the state other than FIX are assumed to be respectively Σ5_prv and θy_prv2. Subsequently, the coordinate system Σ5_prv is rotated by (θy−θy_prv2) about a y-axis of the coordinate system Σ5_prv, thereby determining the coordinate system 15'.

Thus, the fore end position of the bucket 7 on the global coordinate system Σ0 can be determined from the coordinate system Σ5' determined as described above and the bucket fore-end coordinate systems Σ9 that is determined from the positional relationships a6 and d6 relative to the base end of the boom 5, the respective dimensions a7, a8 and a9 of the boom 5, the arm 6 and the bucket 7, as well as the boom angle φ6, the arm angle φ7 and the bucket angle φ8.

Accordingly, even when the measurement accuracy of both of GPS_A and GPS_B is in the state other than FIX, the fore end position of the bucket 7 can be determined at high accuracy. In this case, however, operations are restricted to only the operation of the front mechanism, including swing, because there occurs an error if the hydraulic excavator 1 is traveled.

Figure 6:
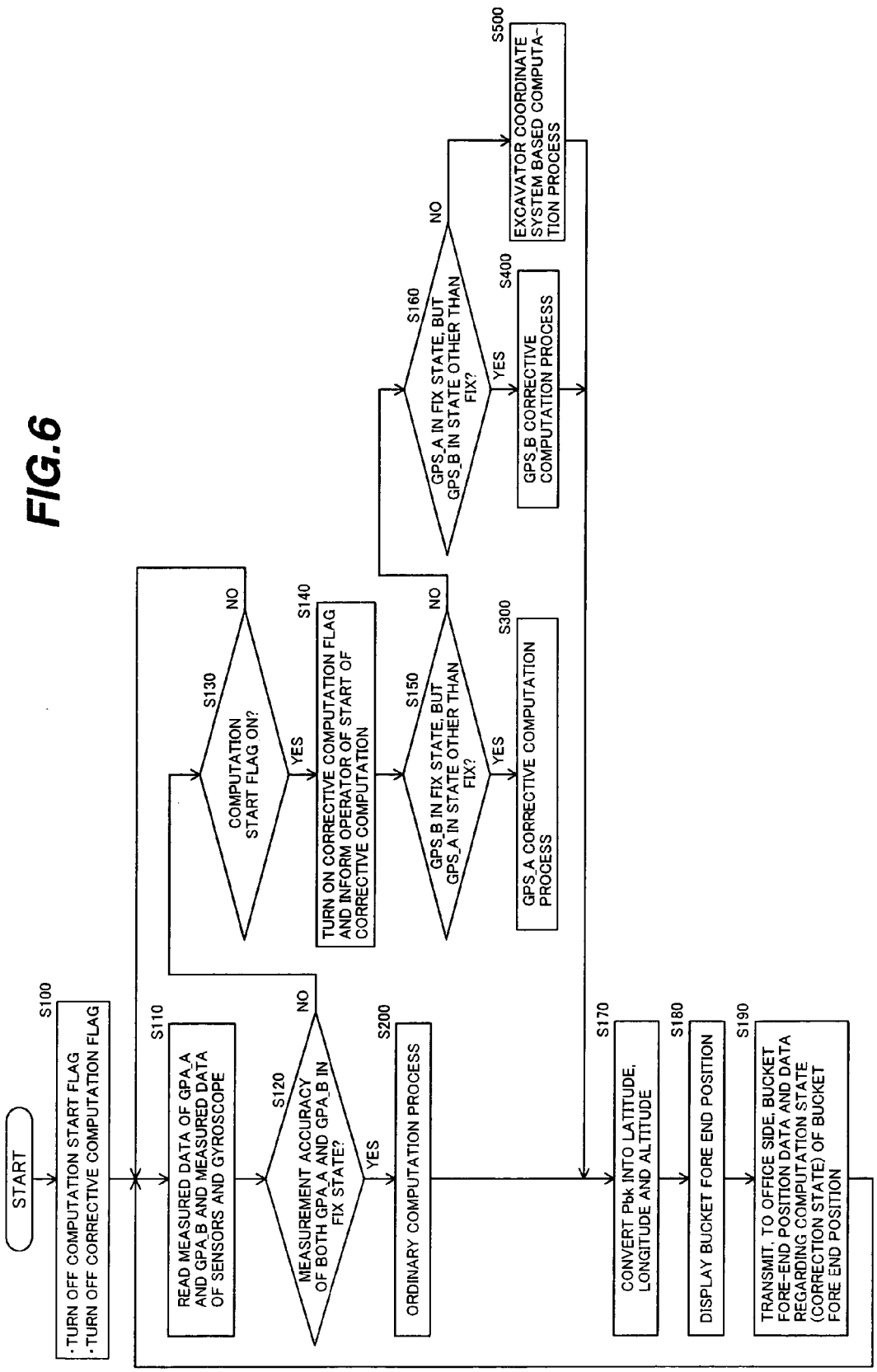
FIG. 6 is a flowchart showing overall processing procedures.

FIG. 6 is a flowchart showing overall processing procedures.

In FIG. 6, a computation start flag and a corrective computation flag are first turned off (step S100).

Then, the panel computer reads the measured data of GPS_A and GPS_B, which represent the three-dimensional positions (latitude, longitude and altitude) of the GPS antennas 31, 32, and the measured data of the sensors 21, 22, 23 and 24 and the gyroscope 25 (step S110). Then, it is determined whether the measurement accuracy of both of GPS_A and GPS_B is in the FIX state (step S120). If the measurement accuracy of both of GPS_A and GPS_B is in the FIX state, the processing flow goes to step S200 in which an ordinary computation process is executed. If the measurement accuracy of either GPS_A or GPS_B is in the state other than FIX, the processing flow goes to step S130. The ordinary computation process is to compute the fore end position of the bucket by using both GPS_A and GPS_B when the measurement accuracy of both of GPS_A and GPS_B is in the FIX state. Details of the ordinary computation process will be described later with reference to FIG. 7.

If the measurement accuracy of either GPS_A or GPS_B is in the state other than FIX, it is determined whether the computation start flag is turned on (step S130). If turned on, the processing flow goes to step S140, and if not turned on, the processing flow returns to step S110 to repeat the above-described processing until the measurement accuracy of both of GPS_A and GPS_B comes into the FIX state.

If the computation start flag is determined as being turned on in step S130, the corrective computation flag is turned on to inform an operator, using the display unit 46 or the speaker 47, that corrective computation is executed (step S140).

Subsequently, it is determined whether the measurement accuracy of GPS_B is in the FIX state and the measurement accuracy of GPS_A is in the state other than FIX (step S150). If the measurement accuracy of GPS_B is in the FIX state and the measurement accuracy of GPS_A is in the state other than FIX, the processing flow goes to step S300 in which a GPS_A corrective computation process is executed. If not so, the processing flow goes to step S160. The GPS_A corrective computation process is to compute the fore end position of the bucket by using the measured data of GPS_B because the measurement accuracy of GPS_A is not in the FIX state. Details of the GPS_A corrective computation process will be described below with reference to FIG. 8.

If the determination result in step S150 is "NO", it is determined whether the measurement accuracy of GPS_A is in the FIX state and the measurement accuracy of GPS_B is in the state other than FIX (step S160). If the measurement accuracy of GPS_A is in the FIX state and the measurement accuracy of GPS_B is in the state other than FIX, the processing flow goes to step S400 in which a GPS_B corrective computation process is executed. If not so, the processing flow goes to step S500 in which an excavator coordinate system based computation process is executed. The GPS_B corrective computation process is to compute the fore end position of the bucket by using the measured data of GPS_A because the measurement accuracy of GPS_B is not in the FIX state. Details of the GPS_B corrective computation process will be described below with reference to FIG. 9. The excavator coordinate system based computation process is to compute the fore end position of the bucket by using the excavator coordinate system because GPS_A and GPS_B cannot be used when the measurement accuracy of both of GPS_A and GPS_B is not in the FIX state. Details of the excavator coordinate system based computation process will be described below with reference to FIG. 10.

After completion of the ordinary computation process (step S200), the GPS_A corrective computation process (step S300), the GPS_B corrective computation process (step S400), or the excavator coordinate system based computation process (step S500), the fore end position (Pbk) of the bucket 7 on the global coordinate system 10, which has been computed in each of those processes, is converted into values of latitude, longitude and altitude (step S170). Computation formulae used in that conversion are generally well known, and hence they are omitted here.

Then, the fore end position of the bucket 7 is displayed on the display unit 46 (step S180). The fore end position of the bucket displayed on the display unit 46 is indicated, for example, as an illustration together with the body of the hydraulic excavator in a superposed relation to the three-dimensional landform data. Subsequently, data of the bucket fore-end position and data of a computation status (correction status) of the bucket fore-end position are transmitted to the office side through the wireless unit 47 (step S190). The processing flow is then returned to step S110 to repeat the above-described processing.

Details of the ordinary computation process will be described below with reference to FIG. 7.

If the measurement accuracy of both of GPS_A and GPS_B is in the FIX state, flag setting is first made such that the computation start flag is turned on if it has been turned off and the corrective computation flag is turned off it has been turned on (step S210).

Then, GPS_NG flag processing is executed (step S600). Details of the GPS_NG flag processing are shown in FIG. 11. The GPS_NG flag is a flag indicating whether the measurement accuracy of both of GPS_A and GPS_B is not in the FIX state. If the measurement accuracy of both of GPS_A and GPS_B is not in the FIX state, that NG flag has been turned on in the excavator coordinate system based computation process shown in FIG. 10. If not so, that NG flag is made turned off. Referring to FIG. 11, it is determined whether the GPS_NG flag is turned off (step S610). If the GPS_NG flag is turned off, the processing is brought to an end at once, and if it is turned on, the processing flow goes to step S620. If the GPS_NG flag is turned on, a travel enable command is issued (step S620) and the GPS_NG flag is turned off (step S630). In other words, because it is determined in step S130 that the measurement accuracy of both of GPS_A and GPS_B is in the FIX state, the NG flag is reset from the on-state to the off-state. Additionally, when the NG flag is turned on, the operation of the lower travel body to travel the hydraulic excavator is prohibited as described later in connection with the processing of step S500. In such a case, therefore, the travel enable command is issued after canceling the prohibition of travel.

Figure 7:
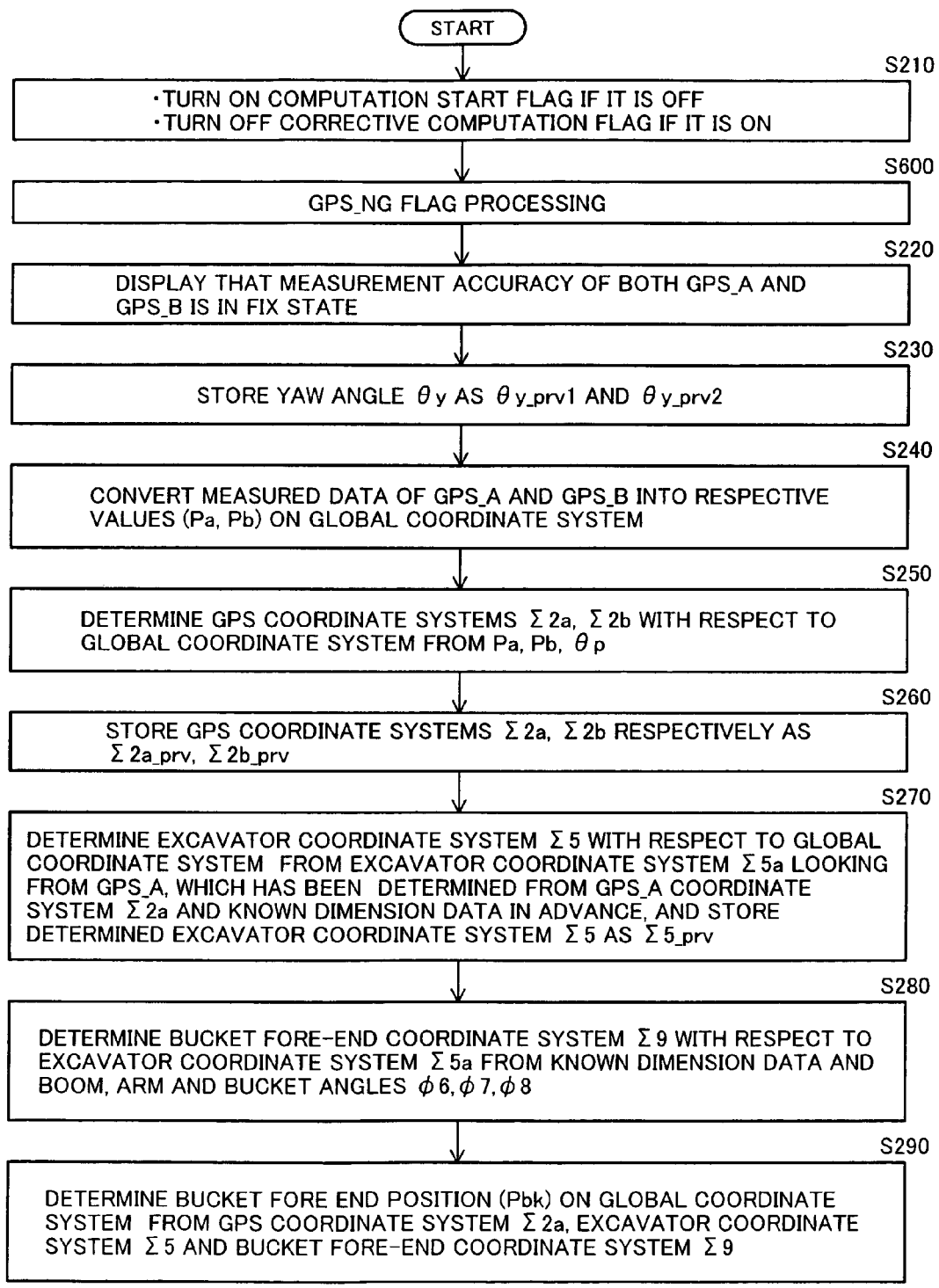
FIG. 7 is a flowchart showing details of an ordinary computation process.

After completion of the GPS_NG flag processing, the processing flow returns to FIG. 7 to display, on the display unit 46, the fact that the measurement accuracy of both of GPS_A and GPS_B is in the FIX state (step S220). Then, the yaw angle $\theta y$ of the hydraulic excavator 1 measured by the gyroscope 25 is stored as $\theta y\_prv1$ and $\theta y\_prv2$ (step S230). Then, the respective measured data of GPS_A and GPS_B are converted into three-dimensional positions Pa, Pb on the global coordinate system 10 (step S240). Computation formulae used in that conversion are generally well known, and hence they are omitted here. Then, the GPS coordinate systems $\Sigma 2a$ and $\Sigma 2b$ with respect to the global coordinate system are determined from the three-dimensional positions Pa, Pb of the GPS antennas 31, 32 on the global coordinate system $\Sigma 0$ and the pitch angle $\theta p$ measured by the inclination sensor 24 (step S250). Computations performed in this step are coordinate transforms and hence can be executed by general mathematical methods. Then, the GPS coordinate systems $\Sigma 2a$ and $\Sigma 2b$ are stored respectively as $\Sigma 2a\_prv$ and $\Sigma 2b\_prv$ (step S260). Then, the excavator coordinate system $\Sigma 5$ with respect to the global coordinate system $\Sigma 0$ is determined from the GPS coordinate system $\Sigma 2a$ and the excavator coordinate system $\Sigma 5a$ looking from GPS_A, which has been determined from the known dimensional data in advance, and it is stored as $\Sigma 5\_prv$ (step S270). Computations performed in this step are also coordinate transforms and hence can be executed by general mathematical methods. Then, the bucket fore-end coordinate systems $\Sigma 9$ with respect to the excavator coordinate system $\Sigma 5a$ is determined from the known dimension data, and the boom angle $\phi 6$, the arm angle $\phi 7$ and the bucket angle $\phi 8$ detected by the angle sensors 21 to 23 (step S280).

Computations performed in this step are also coordinate transforms and hence can be executed by general mathematical methods.

Subsequently, the fore end position Pbk of the bucket 7 on the global coordinate system Σ0 is determined from the GPS coordinate system Σ2a, the excavator coordinate system 15, and the bucket fore-end coordinate systems Σ9 (step S290). Computations performed in this step are also coordinate transforms and hence can be executed by general mathematical methods.

After completion of the ordinary computation process (step S200), the fore end position Pbk of the bucket 7 on the global coordinate system 10, which has been determined as described above, is converted into values of latitude, longitude and altitude in step S170 of FIG. 6. The processing flow is then returned to step S110 to repeat the above-described processing.

Details of the GPS_A corrective computation process will be described below with reference to FIG. 8.

After completion of the GPS_NG flag processing in step S600, the panel computer displays, on the display unit 46, the fact that the measurement accuracy of GPS_A is in the state other than FIX and the corrective computation is being executed (step S310). Then, the yaw angle θy of the hydraulic excavator 1 measured by the gyroscope 25 is stored as θy_prv2 (step S320). Then, the measured data of GPS_B is converted into a three-dimensional position Pb on the global coordinate system 10, and the origin of Σ2b_prv is translated to Pb (step S330). Then, the translated coordinate system Σ2b_prv is subjected to equivalent rotation conversion so that a y-axis of the translated coordinate system Σ2b-prv matches with the gravity axis (step S340). Then, the coordinate system Σ2b_prv having been subjected to the equivalent rotation conversion is rotated by (θy−θy_prv1) about the y-axis of the coordinate system Σ2b_prv having been subjected to the equivalent rotation conversion (step S350). Then, the rotated coordinate system Σ2b_prv is subjected to equivalent rotation conversion so that the y-axis of the rotated coordinate system Σ2b_prv matches with the vector Gpr perpendicular to the body of the hydraulic excavator 1, thereby determining Σ2b' (step S360). Then, the excavator coordinate system Σ5 with respect to the global coordinate system Σ0 is determined from the GPS coordinate system Σ2b' and the excavator coordinate system 25b looking from GPS_B, which has been determined from the known dimensional data in advance, and it is stored as Σ5_prv (step S370). Then, the bucket fore-end coordinate systems 19 with respect to the excavator coordinate system is determined from the known dimension data, and the boom angle φ6, the arm angle φ7 and the bucket angle φ8 detected by the angle sensors 21 to 23 (step S380). Subsequently, the fore end position Pbk of the bucket 7 on the global coordinate system 10 is determined from the coordinate system Σ2b', the excavator coordinate system Σ5, and the bucket fore-end coordinate systems Σ9 (step S390). The processing flow then shifts to step S170 to repeat the above-described processing.

This example is featured in that, as executed in the processing of step S350, correction is made for GPS_B based on the yaw angle θy when the measurement accuracy of GPS_A is in the state other than FIX. The processing of steps S340 and S360 represents correction for the inclination angles (i.e., the pitch angle and the roll angle) of the upper swing body, and hence that processing is not required when the upper swing body is in a horizontal posture.

Details of the GPS_B corrective computation process will be described below with reference to FIG. 9.

After completion of the GPS_NG flag processing in step S600, the panel computer displays, on the display unit 46, the fact that the measurement accuracy of GPS_B is in the state other than FIX and the corrective computation is being executed (step S410). Then, the yaw angle θy of the hydraulic excavator 1 measured by the gyroscope 25 is stored as θy_prv2 (step S420). Then, the measured data of GPS_A is converted into a three-dimensional position Pa on the global coordinate system 10, and the origin of Σ2a_prv is translated to Pa (step S430). Then, the translated coordinate system Σ2a_prv is subjected to equivalent rotation conversion so that a y-axis of the translated coordinate system Σ2a_prv matches with the gravity axis (step S440). Then, the coordinate system Σ2a_prv having been subjected to the equivalent rotation conversion is rotated by (θy−θy_prv1) about the y-axis of the coordinate system Σ2a_prv having been subjected to the equivalent rotation conversion (step S450).

Then, the rotated coordinate system 12a_prv is subjected to equivalent rotation conversion so that the y-axis of the rotated coordinate system Σ2a_prv matches with the vector Gpr perpendicular to the body of the hydraulic excavator 1, thereby determining Σ2a' (step S460). Then, the excavator coordinate system Σ5 with respect to the global coordinate system Σ0 is determined from the GPS coordinate system Σ2a' and the excavator coordinate system Σ5a looking from GPS_A, which has been determined from the known dimensional data in advance, and it is stored as Σ5_prv (step S470).

Then, the bucket fore-end coordinate systems Σ9 with respect to the excavator coordinate system is determined from the known dimension data, and the boom angle φ6, the arm angle φ7 and the bucket angle φ8 detected by the angle sensors 21 to 23 (step S480). Subsequently, the fore end position Pbk of the bucket 7 on the global coordinate system Σ0 is determined from the coordinate system Σ2a', the excavator coordinate system Σ5, and the bucket fore-end coordinate systems Σ9 (step S490). The processing flow then shifts to step S170 to repeat the above-described processing.

This example is featured in that, as executed in the processing of step S450, correction is made for GPS_A based on the yaw angle θy when the measurement accuracy of GPS_B is in the state other than FIX. The processing of steps S440 and S460 represents correction on the inclination angles (i.e., the pitch angle and the roll angle) of the upper swing body, and hence that processing is not required when the upper swing body is in a horizontal posture.

Details of the excavator coordinate system based computation process will be described below with reference to FIG. 10.

The panel computer displays, on the display unit 46, the fact that the measurement accuracy of both of GPS_A and GPS_B is in the state other than FIX and the corrective computation is being executed (step S510). Then, the panel computer informs an operator, using the display unit 46 or the speaker 47, that the travel operation of the hydraulic excavator 1 is prohibited (step S520). Then, the coordinate system Σ5_prv is rotated by (θy−θy_prv2) about the y-axis of the coordinate system Σ5_prv, thereby determining the coordinate system Σ5' (step S530). Then, the bucket fore-end coordinate systems 19 is determined from the known dimension data, and the boom angle φ6, the arm angle φ7 and the bucket angle φ8 detected by the angle sensors 21 to 23 (step S540). Subsequently, the fore end position Pbk of the bucket 7 on the global coordinate system 10 is determined from the coordinate system Σ5' and the bucket fore-end coordinate systems Σ9 (step S550). Thereafter, the GPS_NG flag is turned on (step S560). The processing flow then shifts to step S170 to repeat the above-described processing.

With the foregoing computations, the absolute position of the fore end position of the bucket 7 in the three-dimensional space can be determined. Therefore, even when the measurement accuracy of GPS_A and/or GPS_B has changed, the absolute position of the fore end position of the bucket 7 in the three-dimensional space can be determined with high accuracy.

According to this embodiment, as described above, by measuring the pitch angle and the roll angle of the hydraulic excavator by the inclination sensor, measuring the yaw angle by the gyroscope, and performing the correction, the position of the monitoring point can be measured with high accuracy and reliability of the position measuring system can be improved even when the GPS measurement accuracy has changed. It is hence possible to increase working efficiency and management efficiency in execution of work.

Figure 12:
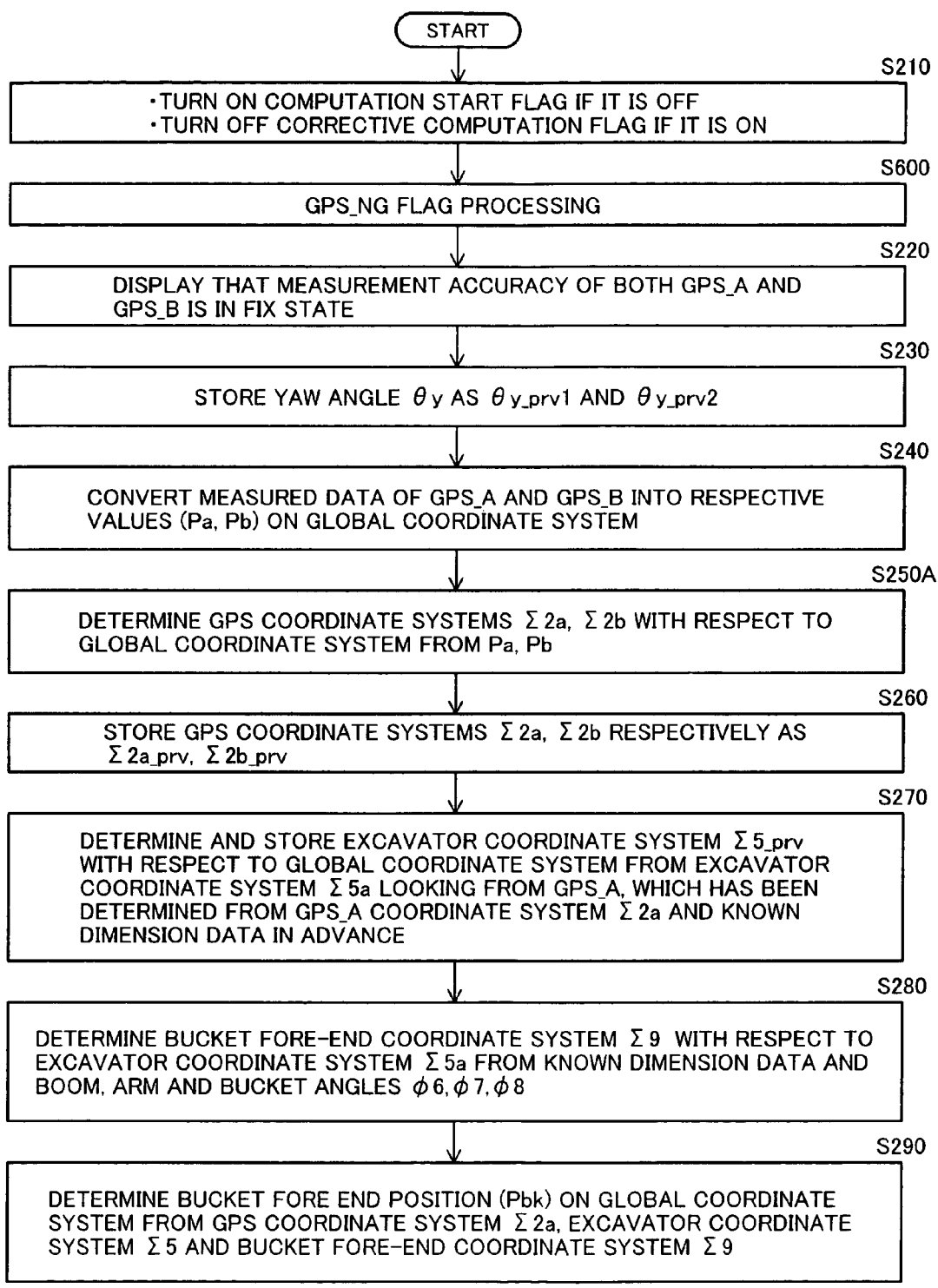
FIG. 12 is a flowchart showing details of an ordinary computation process in another embodiment.
Figure 13:
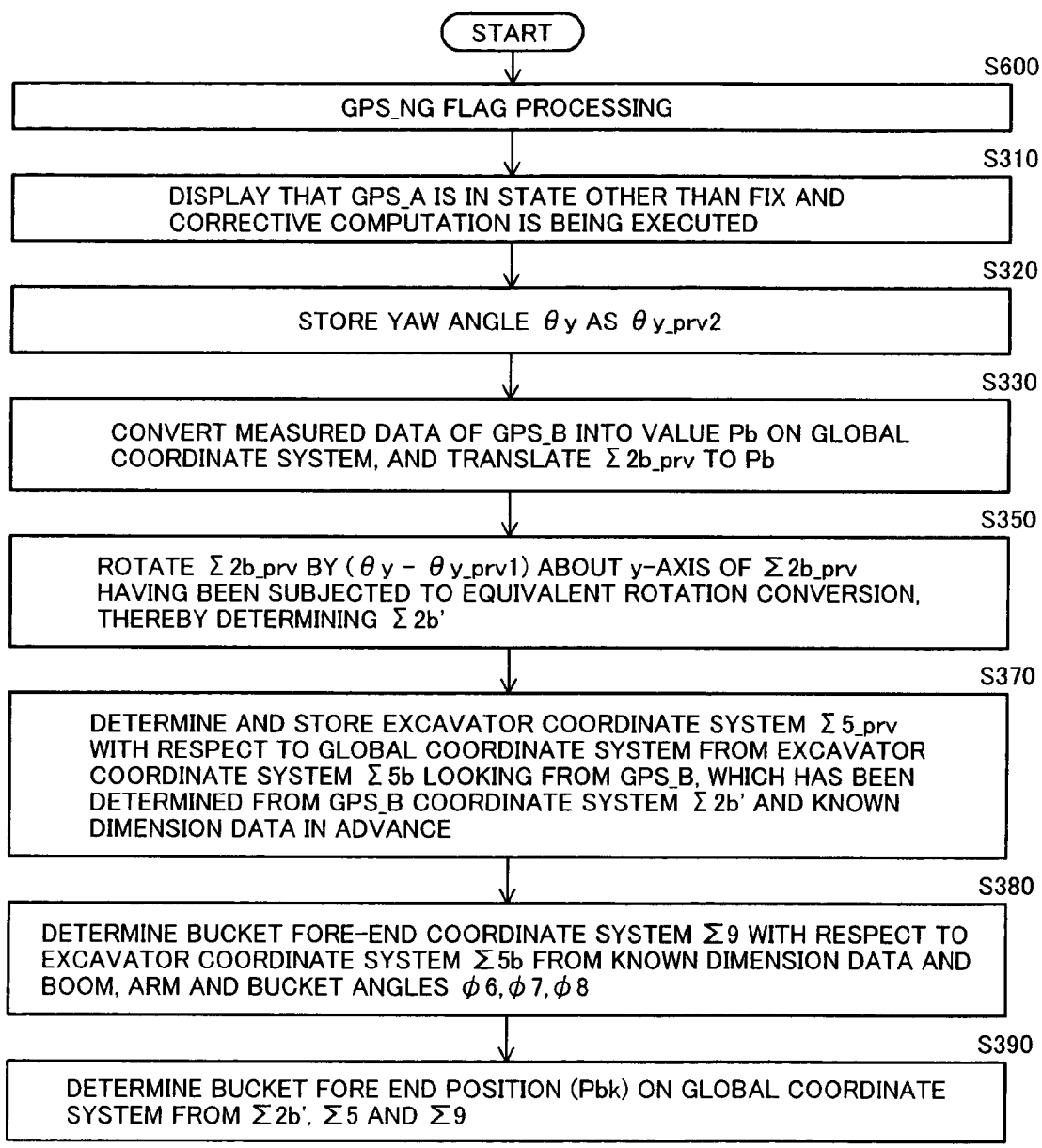
FIG. 13 is a flowchart showing details of a GPS_A corrective computation process in another embodiment.
Figure 14:
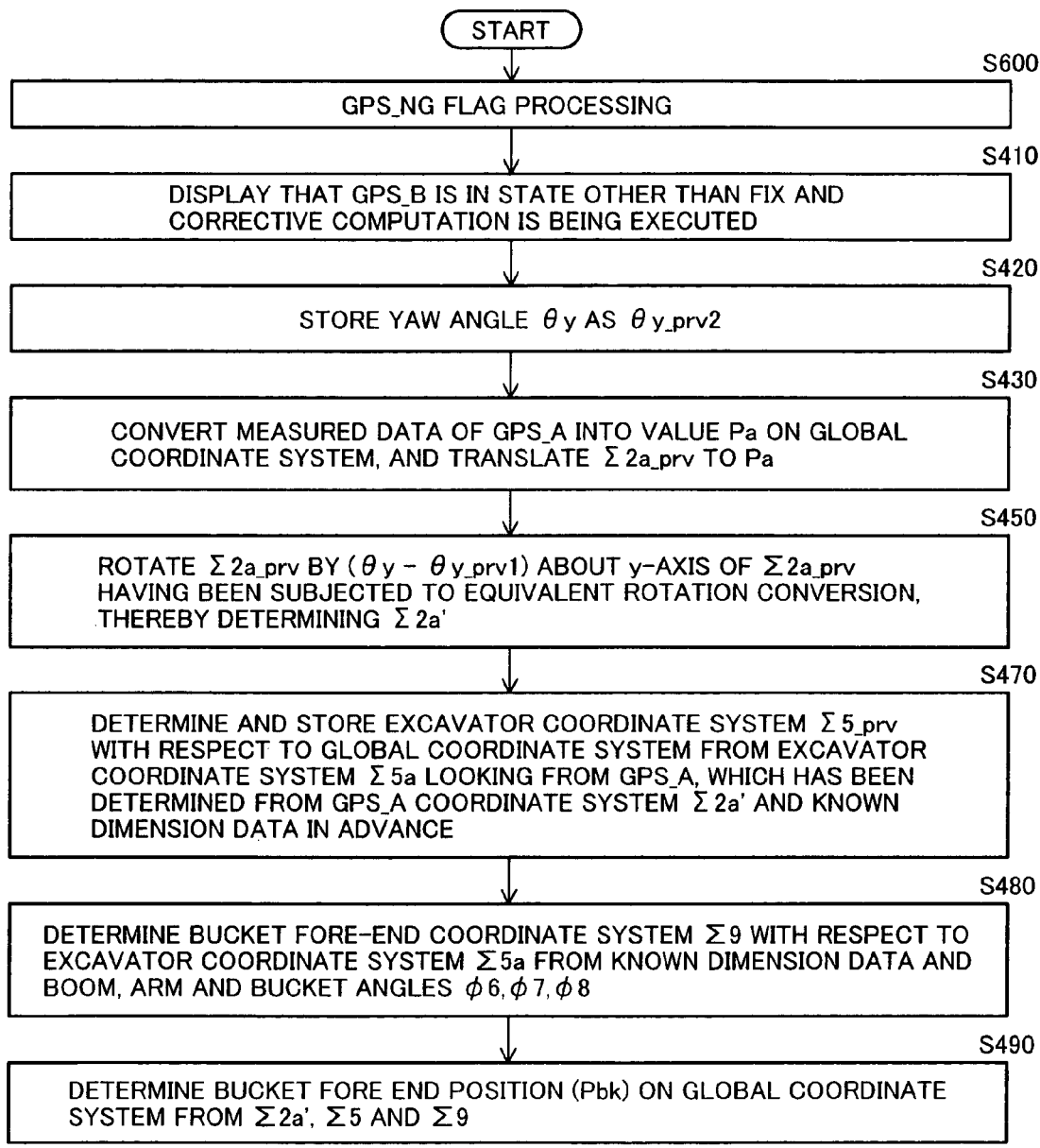
FIG. 14 is a flowchart showing details of a GPS_B corrective computation process in another embodiment.

A position measuring system for a working machine according to another embodiment of the present invention will be described below with reference to FIGS. 12 to 14. In this embodiment, as in the above-described embodiment, the present invention is applied to a crawler type hydraulic excavator, i.e., a construction machine as typical one of working machines, and a monitoring point is set to the bucket fore end of the hydraulic excavator.

In this embodiment, the correction is made on the yaw angle detected by the gyroscope, but is not made on the inclination angles (i.e., the pitch angle and the roll angle) of the upper swing body detected by the inclination sensor. This embodiment is particularly effective in the case of the upper swing body being in a horizontal posture.

The configuration of the position measuring system for the working machine according to this embodiment is the same as that shown in FIG. 1. The hydraulic excavator equipped with the work position measuring system for the construction machine according to this embodiment has the same outer experience as that shown in FIG. 2. However, the inclination sensor 24 is not required because no correction is made on the inclination angles.

The configuration of an office-side system serving as a GPS reference station is the same as that shown in FIG. 3. Coordinate systems used for computing the absolute position of the fore end position of the bucket 7 in the three-dimensional space are the same as those shown in FIG. 4. The concept of the global coordinate system is the same as that shown in FIG. 5.

Overall processing procedures are the same as those shown in FIG. 6. In step S110, however, the panel computer does not read, as the sensor measured data, the data measured by the inclination angle sensor.

Details of the ordinary computation process will be described below with reference to FIG. 12.

The details of the ordinary computation process are the same as those shown in FIG. 7 except for that, in step S250A, the GPS coordinate systems $\Sigma 2a$ and $\Sigma 2b$ with respect to the global coordinate system are determined from the three-dimensional positions Pa, Pb of the GPS antennas 31, 32 on the global coordinate system 10. In other words, the pitch angle $\theta p$ measured by the inclination sensor 24 is not used in step S250A.

Details of the GPS_A corrective computation process will be described below with reference to FIG. 13.

Figure 8:
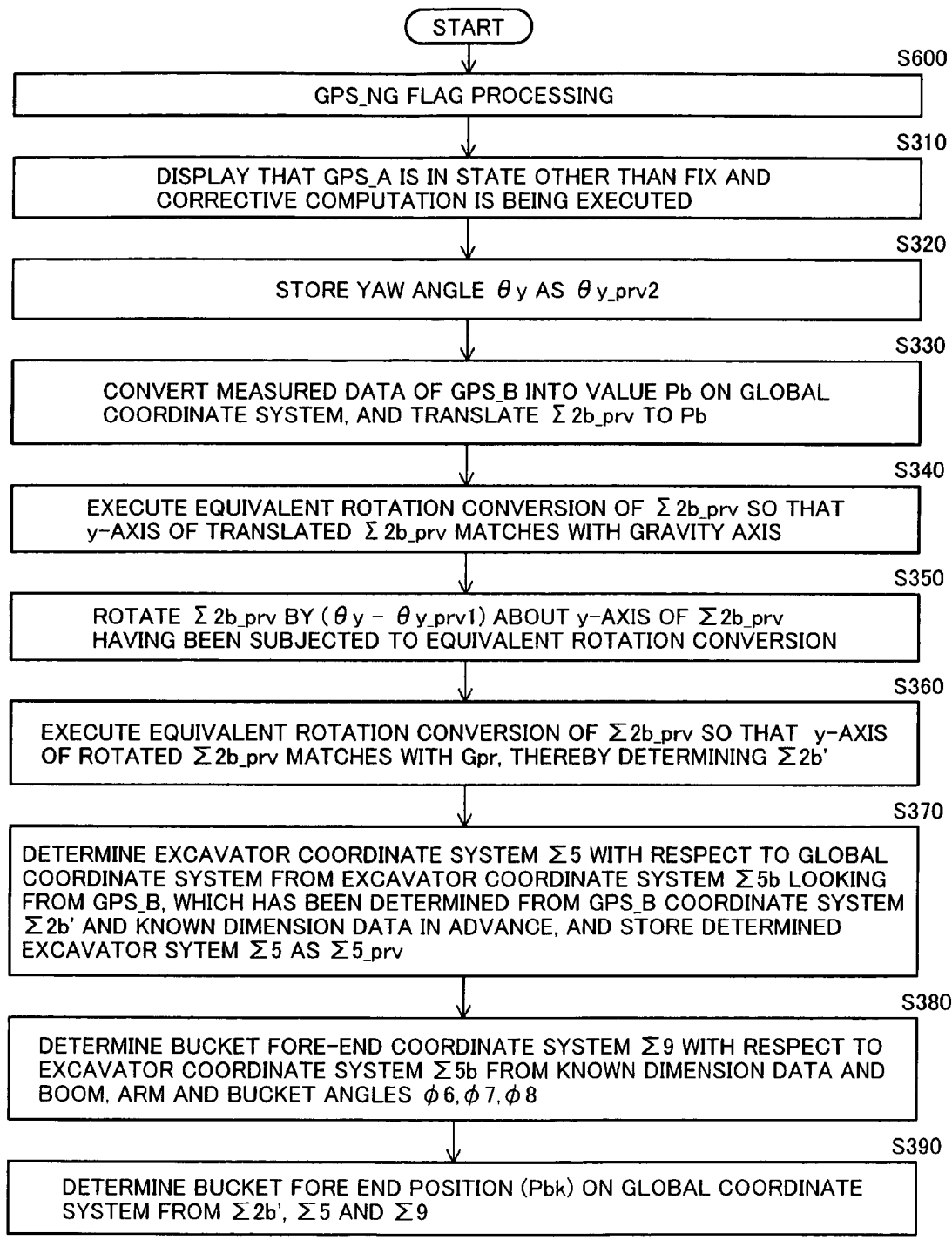
FIG. 8 is a flowchart showing details of a GPS_A corrective computation process.

The details of the GPS_A corrective computation process are the same as those shown in FIG. 8 except for that the processing of step S340 and step S360 is omitted and the processing result of step S350 is directly obtained as the GPS coordinate system $\Sigma 2b'$.

Details of the GPS_B corrective computation process will be described below with reference to FIG. 14.

Figure 9:
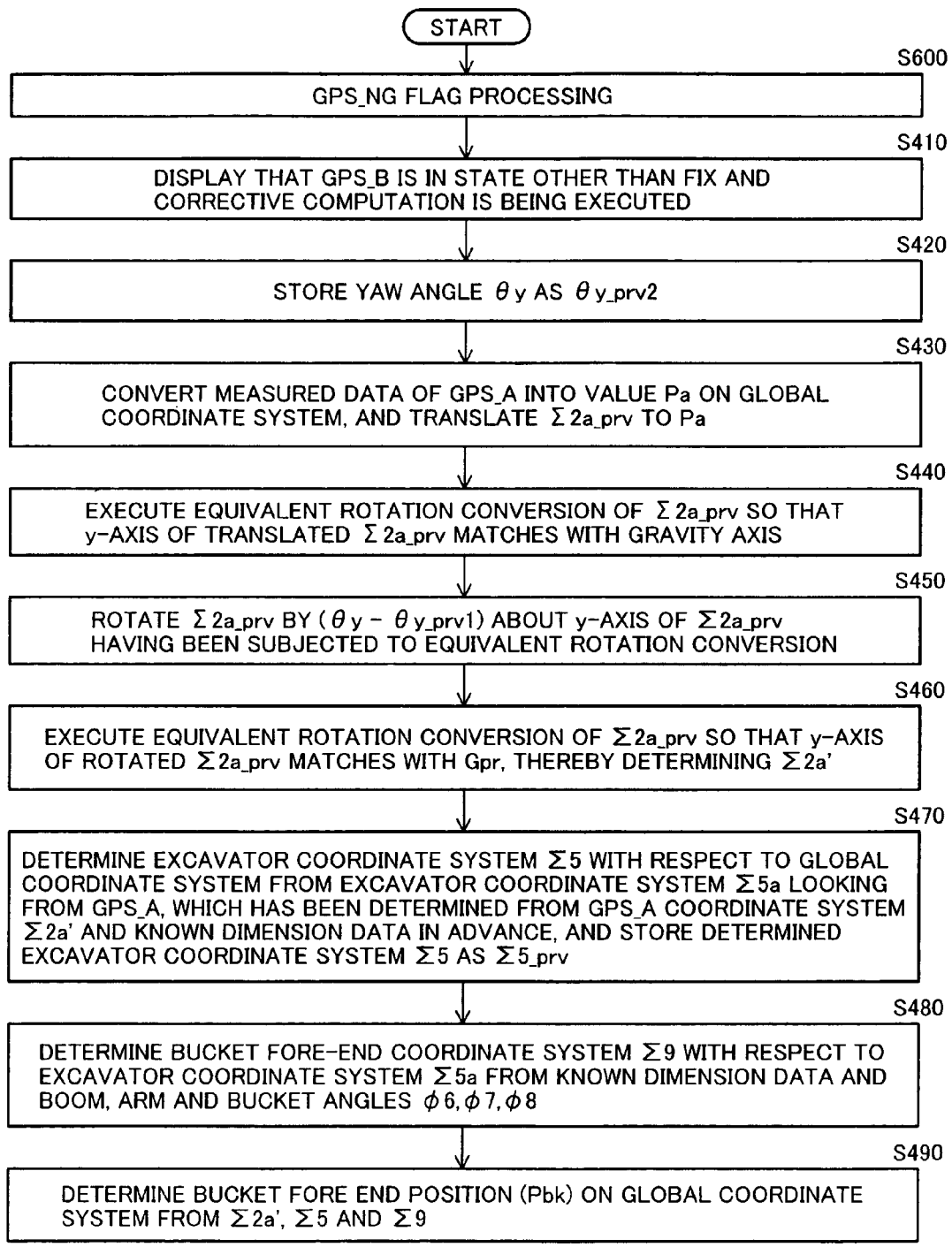
FIG. 9 is a flowchart showing details of a GPS_B corrective computation process.

The details of the GPS_B corrective computation process are the same as those shown in FIG. 9 except for that the processing of step S440 and step S460 is omitted and the processing result of step S450 is directly obtained as the GPS coordinate system $\Sigma 2a'$.

Figure 10:
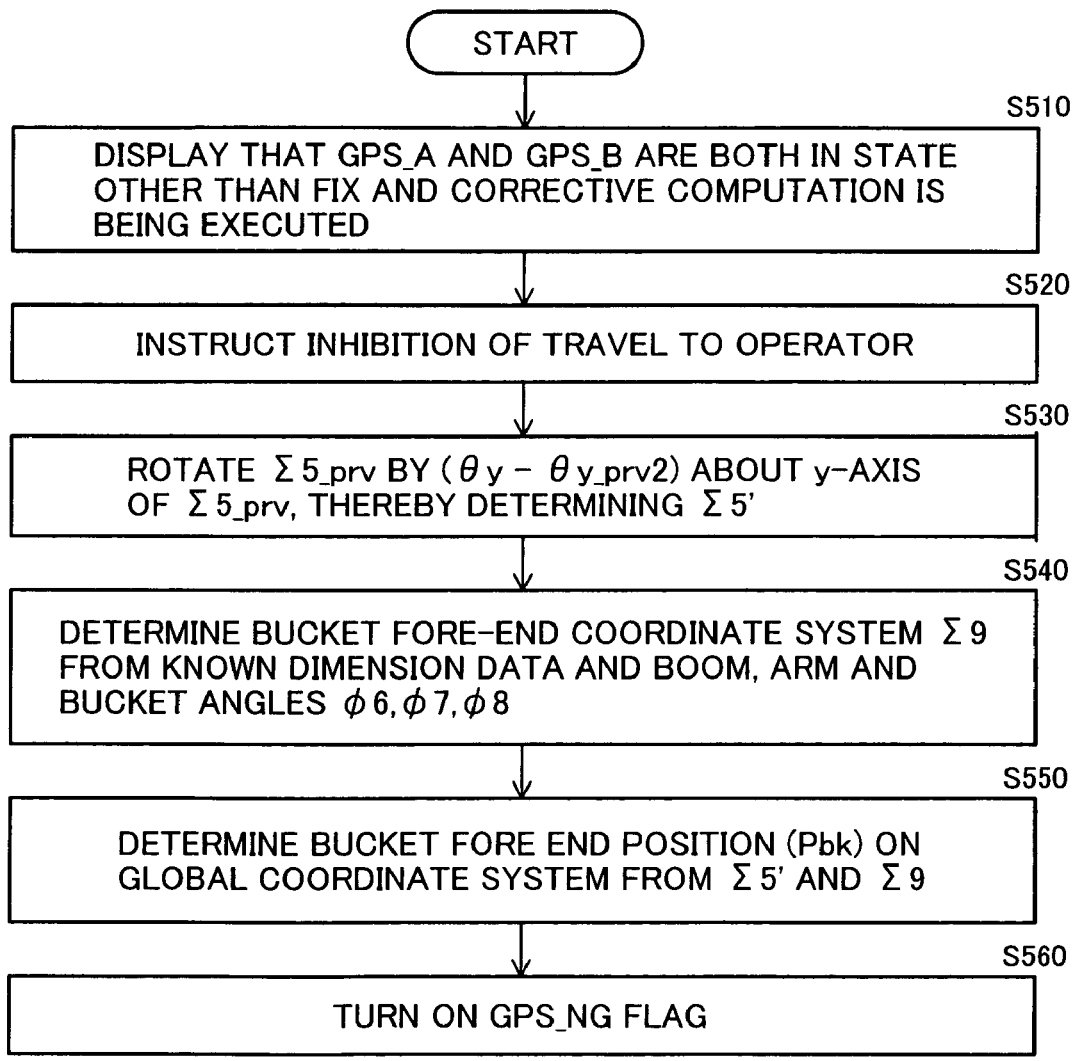
FIG. 10 is a flowchart showing details of an excavator coordinate system based computation process.
Figure 11:
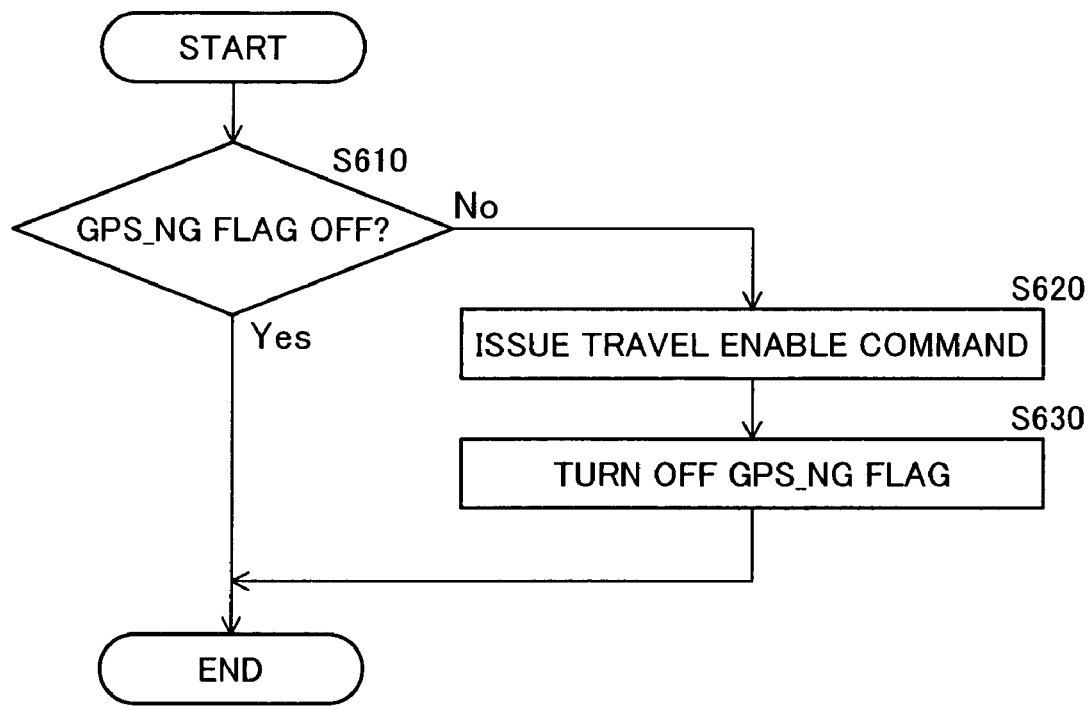
FIG. 11 is a flowchart showing details of GPS_NG flag processing.

The excavator coordinate system based computation process is the same as that shown in FIG. 10.

With the foregoing computations, the absolute position of the fore end position of the bucket 7 in the three-dimensional space can be determined. Therefore, even when the measurement accuracy of GPS_A and/or GPS_B has changed, the absolute position of the fore end position of the bucket 7 in the three-dimensional space can be determined with high accuracy.

According to this embodiment, as described above, by measuring the yaw angle by the gyroscope and performing the correction, the position of the monitoring point can be measured with high accuracy and reliability of the position measuring system can be improved even when the GPS measurement accuracy has changed. It is hence possible to increase working efficiency and management efficiency in execution of work.

While the above description is made in connection with the embodiments in which the present invention is applied to the construction machine, such as the hydraulic excavator, utilizing the GPS, the present invention is also applicable to a total station system utilizing a laser instead of the GPS. In the total station system, when a signal emitted from the laser is interrupted, a reduction of position accuracy can be avoided by executing the corrective computation process. Further, while the construction machine comprises the lower travel structure and the upper swing body mounted on the former, the present invention is also applicable to a working machine having only a lower travel structure, such as a mine searching machine or a mine destroying machine.

INDUSTRIAL APPLICABILITY

According to the present invention, even when the measurement accuracy of a machine-equipped GPS has changed, it is possible to accurately measure the position of the monitoring point and to increase working efficiency.

The invention claimed is:

1. A position measuring system for a hydraulic excavator comprising a lower travel structure, an upper swing body swingably mounted to said lower travel structure and a front operating mechanism mounted to said upper swing body, the position measuring system comprising:

a first means for measuring three-dimensional positions disposed in said upper swing body and measuring positions of said upper swing body in a three-dimensional space when said first three-dimensional position measuring means is in a first state of measurement accuracy;

a second means for measuring three-dimensional positions disposed in said upper swing body and measuring positions of said upper swing body in a three-dimensional space independently of said first means when said second three-dimensional position measuring means is in a first state of measurement accuracy;

means for computing a position of a monitoring point in the three-dimensional space based on values measured by said first and second position measuring means;

means for measuring a yaw angle of said hydraulic excavator; and display means, wherein said position computing means computes the position of the monitoring point based on a coordinate system of said front operating mechanism when both said first and second three-dimensional position measuring means change from said first state of measurement accuracy, and wherein, when the measurement accuracy of both said first and second three-dimensional position measuring means changes from said first state, movement of said upper swing body, which is movement of a front mechanism including swing movement is enabled, and said position computing means displays at said display means that travel of said lower travel structure is prohibited.

2. A position measuring system for a hydraulic excavator according to claim 1, wherein said front operating mechanism has a plurality of rotatable members and angle sensors for measuring respective angles of the rotatable members, and wherein said position computing means computes the position of the monitoring point by determining on said coordinate system of said front operating mechanism on the basis of a coordinate system of the machine body and values of the angle sensors.

3. A position measuring system for a hydraulic excavator according to claim 1, wherein, when the measurement accuracy of at least one of said at least two three-dimensional position measuring means exceeds the predetermined value, said position computing means informs an operator that travel of said hydraulic excavator is enabled.

4. A position measuring system for a hydraulic excavator according to claim 1, further comprising:

said display means displaying the position of the monitoring point in accordance with a computation result of said position computing means, wherein notices to be informed to the operator are displayed on said display means.

5. A position measuring system for a hydraulic excavator according to claim 1, further comprising:

data output means for outputting position data of the monitoring point obtained as the computation result of said position computing means;

data input means disposed in a position different from said hydraulic excavator and receiving the position data outputted from said data output means; and second display means for displaying the position of the monitoring point in accordance with the position data received by said data input means, wherein notices to be informed to the operator are displayed on said display means.

6. A position measuring system for a hydraulic excavator according to claim 1, wherein said front operating mechanism comprises a plurality of rotatable members, the monitoring point is set on said front operating mechanism, said position measuring system further comprises angle measuring means for detecting respective angles between two of said plurality of members of said front operating mechanism, and said position computing means computes the position of the monitoring point in the three-dimensional space based on values measured by said first and second position measuring means and said angle measuring means.

7. A position measuring system for a hydraulic excavator comprising a lower travel structure, an upper swing body swingably mounted to said lower travel structure and a front operating mechanism mounted to said upper swing body, the position measuring system comprising:

a first means for measuring three-dimensional positions disposed in said upper swing body and measuring positions of said upper swing body in a three-dimensional space when said first three-dimensional position measuring means is in a first state of measurement accuracy;

a second means for measuring three-dimensional positions disposed in said upper swing body and measuring positions of said upper swing body in a three-dimensional space independently of said first means when said second three-dimensional position measuring means are in a first state of measurement accuracy;

means for computing a position of a monitoring point on said front operating mechanism in the three-dimensional space based on values measured by said two position measuring means;

means for measuring a yaw angle of said hydraulic excavator; and means receiving an output from said position computing means for informing an operator of a change in said first state of measurement accuracy, wherein said position computing means computes the position of the monitoring point based on a coordinate system of said front operating mechanism when measurement accuracy of both said first and second three-dimensional position measuring means changes from said first state, and wherein, said means receiving an output from said position computing means when both said first and second three-dimensional position measuring means change from said first state of measurement accuracy, informs an operator that travel of said lower travel structure is prohibited while movement of said upper swing body is enabled, and prohibits travel of said lower travel structure.

8. A position measuring system for a hydraulic excavator according to claim 7, wherein said means receiving an output from said position computing means when both said two three-dimensional position measuring means change from said first state, informs an operator that travel of said lower travel structure is prohibited through a speaker using voice.

* * * * *